US012765723B2

United States Patent

Hammond et al.

(10) Patent No.: US 12,765,723 B2
(45) Date of Patent: *Oct. 20, 2026

(12) United States Patent

(54) FOOD PROCESSOR

(71) Applicant: Vita-Mix Management Corporation, Olmsted Township, OH (US)

(72) Inventors: Rebecca Hammond, Rocky River, OH (US); David Kolar, Stow, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 337 days.

This patent is subject to a terminal disclaimer.

(21) Appl. No.: 18/543,325

(22) Filed: Dec. 18, 2023

(65) Prior Publication Data

US 2024/0115078 A1 Apr. 11, 2024

Related U.S. Application Data

(63) Continuation of application No. 17/128,625, filed on Dec. 21, 2020, now Pat. No. 11,877,696.
(Continued)

(51) Int. Cl.
*A47J 43/046* (2006.01)
*A47J 43/07* (2006.01)

(52) U.S. Cl.
CPC ......... *A47J 43/046* (2013.01); *A47J 43/0722* (2013.01); *A47J 43/0727* (2013.01)

(58) Field of Classification Search
CPC ............................ A47J 43/046; A47J 43/0727
See application file for complete search history.

(56) References Cited

U.S. PATENT DOCUMENTS 2,372,862 A 4/1945 Strauss et al.
3,175,594 A 3/1965 Jepson
(Continued)

FOREIGN PATENT DOCUMENTS

AU 2012200558 A1 8/2012
CH 172686 A 10/1934
(Continued)

OTHER PUBLICATIONS

"French Digital Kitchen", http://digitalinstitute.ncl.ac.uk/ilablearnkitchen/, retrieved Feb. 20, 2014, 4 pages.
(Continued)

*Primary Examiner* — Claire X Wang
*Assistant Examiner* — Patrick M Mccarty
(74) *Attorney, Agent, or Firm* — DINSMORE & SHOHL LLP

(57) ABSTRACT

A food processor assembly is disclosed. An example food processor assembly includes an assembly base, a bowl base, a bow, a lid, and a blade storage container. The assembly base includes a rotary input shaft that selectively couples to a coupler of a blender base. The bowl base selectively couples to the assembly base with the rotary input shaft extending through the bowl based. The bowl includes a body and a central column integrally formed with the body though which the rotary input shaft extends. The lid selectively couples to the bowl. The lid includes a feed tube to receive food items. The lid having a first vertical orientation to selectively couple to the bowl and a second vertical orientation to selectively couple to the bowl. The blade storage container selectively couples to the lid when the lid in coupled to the bowl in the second vertical orientation.

15 Claims, 8 Drawing Sheets

Related U.S. Application Data

(60) Provisional application No. 62/950,475, filed on Dec. 19, 2019.

(56) References Cited

U.S. PATENT DOCUMENTS

| | | | | | |
|---|---|---|---|---|---|
| D227,535 | S | | 7/1973 | Grimes | |
| 4,561,782 | A | | 12/1985 | Jacobsen et al. | |
| 4,655,373 | A | | 4/1987 | Essen | |
| 4,664,530 | A | | 5/1987 | Kurome et al. | |
| D295,012 | S | | 4/1988 | Gelber | |
| 4,812,623 | A | | 3/1989 | Haden | |
| 4,822,175 | A | | 4/1989 | Barnard et al. | |
| 4,840,239 | A | | 6/1989 | Slagg | |
| 4,891,966 | A | | 1/1990 | Kramer | |
| D305,973 | S | | 2/1990 | Barnard et al. | |
| D309,077 | S | | 7/1990 | Pomroy | |
| D309,399 | S | | 7/1990 | Barnard et al. | |
| 4,942,781 | A | | 7/1990 | Hori | |
| D321,647 | S | | 11/1991 | Oldorf | |
| D336,590 | S | | 6/1993 | Barnard | |
| 5,273,358 | A | | 12/1993 | Byrne | |
| 5,275,307 | A | | 1/1994 | Freese | |
| D345,488 | S | | 3/1994 | Barnard et al. | |
| 5,323,973 | A | | 6/1994 | Ferrara, Jr. | |
| 5,405,096 | A | | 4/1995 | Seol | |
| D366,418 | S | | 1/1996 | Lown et al. | |
| 5,533,797 | A | | 7/1996 | Gelber | |
| 5,544,573 | A | | 8/1996 | Gateaud | |
| 5,544,684 | A | | 8/1996 | Robinette | |
| D374,590 | S | | 10/1996 | Ahern, Jr. | |
| 5,678,718 | A | | 10/1997 | Morris et al. | |
| 5,696,358 | A | | 12/1997 | Pfordresher | |
| 5,803,598 | A | | 9/1998 | Harry et al. | |
| 5,901,906 | A | | 5/1999 | Bouldin | |
| 5,927,183 | A | * | 7/1999 | Lee | A47J 47/10 99/403 |
| D412,809 | S | | 8/1999 | Toro et al. | |
| 5,934,181 | A | | 8/1999 | Adamczewski | |
| 5,957,333 | A | | 9/1999 | Losenno et al. | |
| 5,957,577 | A | | 9/1999 | Dickson et al. | |
| 5,962,060 | A | | 10/1999 | Farrell | |
| D419,369 | S | | 1/2000 | Naft et al. | |
| 6,059,445 | A | | 5/2000 | St. John et al. | |
| D429,956 | S | | 8/2000 | Bohannon, Jr. et al. | |
| 6,102,246 | A | | 8/2000 | Goulet et al. | |
| D432,204 | S | | 10/2000 | Brady | |
| D432,864 | S | | 10/2000 | Kindig et al. | |
| D435,192 | S | | 12/2000 | Bohannon, Jr. et al. | |
| D437,731 | S | | 2/2001 | Thackray | |
| 6,251,040 | B1 | | 6/2001 | Safont | |
| D452,296 | S | | 12/2001 | Egnell et al. | |
| 6,412,398 | B1 | | 7/2002 | Norcross | |
| 6,431,744 | B1 | | 8/2002 | Ash et al. | |
| 6,531,967 | B2 | | 3/2003 | Djorup | |
| 6,616,324 | B1 | | 9/2003 | Planca et al. | |
| D480,915 | S | | 10/2003 | Kolar et al. | |
| D481,258 | S | | 10/2003 | Brady et al. | |
| 6,690,128 | B1 | | 2/2004 | Cotton | |
| 6,755,305 | B2 | | 6/2004 | Nance | |
| D495,925 | S | | 9/2004 | Ulanski et al. | |
| 6,793,096 | B1 | | 9/2004 | Seok | |
| 6,837,148 | B1 | | 1/2005 | Deschenes | |
| 6,854,876 | B2 | | 2/2005 | Dickson, Jr. | |
| D506,393 | S | | 6/2005 | Nottingham et al. | |
| 6,907,819 | B2 | | 6/2005 | Kernan | |
| 6,978,221 | B1 | | 12/2005 | Rudy | |
| 6,979,117 | B2 | | 12/2005 | Dickson, Jr. | |
| 6,982,640 | B2 | | 1/2006 | Lindsay | |
| D514,868 | S | | 2/2006 | Achenbach et al. | |
| 7,063,456 | B2 | | 6/2006 | Miller et al. | |
| D526,839 | S | | 8/2006 | Boozer et al. | |
| D528,363 | S | | 9/2006 | Ulanski et al. | |
| 7,267,478 | B2 | | 9/2007 | Miller et al. | |
| D552,916 | S | | 10/2007 | Bodum | |
| 7,292,146 | B1 | | 11/2007 | Nguyen | |
| 7,341,209 | B1 | | 3/2008 | Ko | |
| 7,350,963 | B2 | | 4/2008 | Williams et al. | |
| 7,409,765 | B2 | | 8/2008 | So | |
| D577,545 | S | | 9/2008 | Ulanski | |
| D587,064 | S | | 2/2009 | Mark | |
| D587,526 | S | | 3/2009 | Barnard et al. | |
| D588,406 | S | | 3/2009 | Ulanski et al. | |
| 7,523,302 | B1 | | 4/2009 | Brown | |
| 7,566,186 | B2 | | 7/2009 | Katz | |
| 7,620,568 | B1 | | 11/2009 | Parker-Malchak | |
| 7,680,691 | B2 | | 3/2010 | Kimball | |
| 7,685,933 | B2 | | 3/2010 | Fevbre | |
| 7,686,240 | B2 | | 3/2010 | Pryor | |
| D621,656 | S | | 8/2010 | Ulanski et al. | |
| 7,871,195 | B2 | | 1/2011 | Larsen | |
| D637,870 | S | | 5/2011 | Bock | |
| 8,122,820 | B2 | | 2/2012 | Conti et al. | |
| D660,642 | S | | 5/2012 | Boozer | |
| D662,359 | S | | 6/2012 | Boozer et al. | |
| 8,200,548 | B2 | | 6/2012 | Wiedl | |
| 8,226,021 | B2 | | 7/2012 | Wilson | |
| 8,235,724 | B2 | | 8/2012 | Gilley | |
| 8,262,005 | B2 | | 9/2012 | Garcia | |
| 8,330,057 | B2 | | 12/2012 | Sharawi | |
| D678,727 | S | | 3/2013 | Kolar et al. | |
| 8,506,437 | B2 | | 8/2013 | Cheung | |
| 8,529,120 | B2 | | 9/2013 | Ulanski et al. | |
| 8,555,922 | B2 | | 10/2013 | Migliore et al. | |
| 8,636,516 | B2 | | 1/2014 | Batsikouras | |
| 8,770,983 | B2 | | 7/2014 | Batsikouras | |
| 8,814,011 | B2 | | 8/2014 | Ulanski et al. | |
| 8,829,365 | B1 | | 9/2014 | Wallace | |
| 8,920,019 | B2 | | 12/2014 | Kozlowski | |
| 9,389,117 | B2 | | 7/2016 | Merea | |
| 9,529,385 | B2 | | 12/2016 | Connor | |
| 9,635,981 | B2 | | 5/2017 | Barnard | |
| 9,645,007 | B2 | | 5/2017 | Wallace | |
| D797,496 | S | | 9/2017 | Gee | |
| D812,963 | S | | 3/2018 | Smith | |
| D830,115 | S | | 10/2018 | Gee | |
| D832,029 | S | | 10/2018 | Gee | |
| D846,339 | S | | 4/2019 | Smith | |
| D846,352 | S | | 4/2019 | Smith | |
| 10,257,753 | B2 | | 4/2019 | Sirotkin | |
| 10,413,131 | B2 | | 9/2019 | Kolar | |
| D863,873 | S | | 10/2019 | Kettavong | |
| 10,695,935 | B2 | | 6/2020 | Zakowski | |
| 11,013,371 | B2 | | 5/2021 | Kolar | |
| 11,266,270 | B2 | | 3/2022 | Hammond | |
| 11,877,696 | B2 | * | 1/2024 | Hammond | A47J 43/0722 |
| 2002/0047060 | A1 | | 4/2002 | Juriga | |
| 2002/0124017 | A1 | | 9/2002 | Mault | |
| 2002/0141286 | A1 | | 10/2002 | Wulf et al. | |
| 2003/0038045 | A1 | * | 2/2003 | Clausen | G11B 33/0427 |
| 2003/0042805 | A1 | | 3/2003 | Bates et al. | |
| 2003/0159857 | A1 | | 8/2003 | Lin | |
| 2003/0205148 | A1 | | 11/2003 | Rubin et al. | |
| 2004/0118618 | A1 | | 6/2004 | Davidson | |
| 2005/0145717 | A1 | | 7/2005 | Katz et al. | |
| 2005/0152215 | A1 | | 7/2005 | Stuart et al. | |
| 2006/0261066 | A1 | | 11/2006 | Boozer | |
| 2006/0266664 | A1 | * | 11/2006 | Yeh | G11B 33/045 |
| 2007/0131723 | A1 | | 6/2007 | Anderson | |
| 2007/0140048 | A1 | | 6/2007 | Ismail | |
| 2007/0278122 | A1 | | 12/2007 | McCumber et al. | |
| 2007/0286016 | A1 | | 12/2007 | Sun | |
| 2008/0111011 | A1 | | 5/2008 | Wang | |
| 2008/0156913 | A1 | | 7/2008 | Orent | |
| 2009/0009815 | A1 | | 1/2009 | Karasik | |
| 2009/0095322 | A1 | | 4/2009 | Wakao et al. | |
| 2009/0144081 | A1 | | 6/2009 | Harlan | |
| 2009/0157752 | A1 | | 6/2009 | Gonzalez | |
| 2009/0258331 | A1 | | 10/2009 | Do | |
| 2009/0259687 | A1 | | 10/2009 | Do | |
| 2009/0309704 | A1 | | 12/2009 | Chang | |
| 2010/0000801 | A1 | | 1/2010 | Smith | |
| 2010/0027373 | A1 | | 2/2010 | Barnard et al. | |
| 2010/0038149 | A1 | | 2/2010 | Corel | |

(56) References Cited

U.S. PATENT DOCUMENTS

| | | | |
|---|---|---|---|
| 2010/0089152 A1 | 4/2010 | Kolada | |
| 2010/0125181 A1 | 5/2010 | Hyde | |
| 2010/0154658 A1* | 6/2010 | Conti | A47J 43/0711 83/167 |
| 2010/0199823 A1 | 8/2010 | Dalla Piazza et al. | |
| 2010/0212076 A1 | 8/2010 | Kihs | |
| 2010/0229894 A1 | 9/2010 | Nagatani et al. | |
| 2010/0240962 A1 | 9/2010 | Contant | |
| 2010/0308142 A1 | 12/2010 | Krasznai et al. | |
| 2011/0011281 A1 | 1/2011 | Allen | |
| 2011/0044370 A1 | 2/2011 | Schochet | |
| 2011/0167100 A1 | 7/2011 | Brodowski | |
| 2011/0213667 A1 | 9/2011 | Terullo | |
| 2012/0136864 A1 | 5/2012 | Ochtel | |
| 2012/0167712 A1 | 7/2012 | Cheung et al. | |
| 2012/0179665 A1 | 7/2012 | Baarman | |
| 2013/0171304 A1 | 7/2013 | Huntley | |
| 2013/0209972 A1 | 8/2013 | Carter | |
| 2013/0216982 A1 | 8/2013 | Bennett | |
| 2013/0268111 A1 | 10/2013 | Dekar | |
| 2014/0021278 A1 | 1/2014 | Armstrong et al. | |
| 2014/0063180 A1 | 3/2014 | Sharma | |
| 2014/0299687 A1 | 10/2014 | Rosenzweig | |
| 2014/0318874 A1 | 10/2014 | Moses | |
| 2014/0332289 A1 | 11/2014 | Gallagher | |
| 2015/0260699 A1 | 9/2015 | Minvielle | |
| 2015/0265983 A1 | 9/2015 | Fleming et al. | |
| 2015/0305564 A1 | 10/2015 | Jimenez | |
| 2016/0101533 A1 | 4/2016 | Aramburo | |
| 2016/0120367 A1 | 5/2016 | Braun et al. | |
| 2016/0174771 A1 | 6/2016 | Benoit et al. | |
| 2016/0256005 A1 | 9/2016 | Dickson | |
| 2016/0256006 A1 | 9/2016 | Dickson | |
| 2016/0256007 A1 | 9/2016 | Dickson | |
| 2016/0256008 A1 | 9/2016 | Dickson | |
| 2016/0256839 A1 | 9/2016 | Dickson | |
| 2017/0105578 A1 | 4/2017 | Krebs | |
| 2017/0172347 A1 | 6/2017 | Potter | |
| 2017/0325621 A1 | 11/2017 | Herbert | |
| 2018/0028011 A1 | 2/2018 | Cheung et al. | |
| 2018/0078094 A1 | 3/2018 | Haney et al. | |
| 2018/0206677 A1* | 7/2018 | Ivarsson | A47J 36/24 |
| 2018/0213978 A1 | 8/2018 | Gushwa et al. | |
| 2021/0022554 A1 | 1/2021 | Kolar et al. | |

FOREIGN PATENT DOCUMENTS

| | | | |
|---|---|---|---|
| EP | 0963726 A1 | 12/1999 |
| EP | 2085005 A1 | 8/2009 |
| FR | 2696087 A1 | 4/1994 |
| GB | 699947 | 11/1953 |
| GB | 2251960 A | 7/1992 |
| JP | 200510951 A | 1/2005 |
| WO | 8801199 A1 | 2/1988 |
| WO | 2002038456 A1 | 5/2002 |
| WO | 2009100868 A1 | 8/2009 |
| WO | 2011008234 A1 | 1/2011 |
| WO | 2016191538 A1 | 12/2016 |

OTHER PUBLICATIONS

Cheng, Jacqui, "Cooking with the IPad: Which Apps Offer the Best Experience?" Ars Technica. Conde Nast, Aug. 7, 2012. Web. Mar. 3, 2016 <http://arstechnica.com/apple/2012/08/cooking-with-the-ipad-which-apps-offer-the-best-experience/> 8 pgs.

Comstock, Jonah, "Lift Labs raises $1M for tremor-canceling spoon" ,http://mobihealthnews.com/25502/lift-labs-raises-1 m-for-tremor-canceling-spoon/, Sep. 18, 2013, retrieved Feb. 20, 2014, 9 pages.

Discover RFID, http://www.discoverrfid.org/what-is-possible/get-what-you-want/perfectly-cooked-recipes.html, printed Nov. 11, 2013, 1 page.

Hooper, Clare, Clare Hooper's Blog, "More activity recognition", http://www.clarehooper.net/blog/2012/04/more-activity-recognition/, Apr. 17, 2012, retrieved Feb. 20, 2014, 5 pages.

My Recipe Book, "Typing Recipes into the App", Oct., 5, 2012, Retrieved on Apr. 9, 2013 from http://www.myrecipebookapp.com/?p=90, 2 pages.

Notice of Allowance issued in U.S. Appl. No. 13/909,011 dated Oct. 13, 2015; 10 pages.

Office Action issued in U.S. Appl. No. 13/909,011 dated Apr. 6, 2015; 14 pages.

Office Action issued in U.S. Appl. No. 14/185,857 dated Oct. 23, 2015; 22 pages.

Office Action issued in U.S. Appl. No. 14/280,144 dated Apr. 21, 2015, 20 pages.

Office Action issued in U.S. Appl. No. 14/280,144 dated Oct. 8, 2015; 18 pages.

Pham, Cuong et al., "The Ambient Kitchen: A Pervasive Sensing Environment for Situated Services", http://www.clarehooper.net/publications/2012/DIS2012demo.pdf, Jun. 11, 2012, retrieved Feb. 20, 2014, 2 pages.

RFID digital weighing scales with printer, http://www.alibaba.com/productgs/614113341/LED_displayer_RFID_digital_weighing_scales.html, retrieved May 16, 2014, 6 pages.

Roberti, Mark, "RFID's Role in Food Safety", RFID Journal, http://www.rfidjournal.com/articles/view?10864, Jul. 29, 2013, 1 page.

Seth, Radhika, "Tasty Tastings", http://www.yankodesign.com/2012/10/23/tasty-tastings/, Oct. 23, 2012, retrieved Feb. 20, 2014, 7 pages.

Smart Diet Scale Features, http://smartdietscale.com/how-it-works/; retrieved on Apr. 6, 2015; 7 pages.

Terso Solutions, "RFID Refrigerator", http://www.tersosolutions.com/rfid-refrigerators/, retrieved May 19, 2014, 1 page.

Trew, James "HAPILABS introduces HAPIfork (and spoon) smart utensils, brings metrics to your mouthfuls (hands-on)", http://www.engadget.com/2http://www .syncids. com/I DSgraphics/Blan kPage Icon. PNG013/01 /06/hapi labs-introduces-hapifork-andspoon-smart-utensils-brings/, Jan. 6, 2013, retrieved Feb. 20, 2014, 13 pages.

Turnage, Will, "Kitchen Scale App Prototype", http://www.youtube.com/watch?v=S5WNCv4cqfg, Apr. 22, 2012, Retrieved on Jun. 3, 2013, 3 pages.

U.S. Appl. No. 61/800,252, filed Mar. 15, 2013, 54 pages.

Watts, Tom, "Smart Diet Scale makes it easy to lose weight"; The Macomb Daily; Jan. 31, 2013, 2 pages; www.macombdaily.com.

WAX Sensor, http://europeandigitalkitchen.com/wp-content/uploads/2012/01 /Lancook-Utensils- Brochure.pdf, retrieved Feb. 20, 2014, 8 pages.

Wikipedia, "Food Packaging", http://en.wikipedia.org/wiki/Food_packaging, retrieved May 16, 2014, 5 pages.

Translation of Martin et al. (Year: 2009) (Reference is to equivalent WO doc).

Oster Pro 1200, User Manual, 2015, 40 pages.

Veggie Bullet Cookbook, 2016, 17 pages.

* cited by examiner

FOOD PROCESSOR

CROSS-REFERENCE TO RELATED APPLICATIONS

This application is claims priority to U.S. patent application Ser. No. 17/128,625, filed on Dec. 21, 2020 and entitled "FOOD PROCESSOR, which claims priority to U.S. Provisional Patent Application No. 62/950,475 filed on Dec. 19, 2019, the disclosures of which are incorporated herein by reference in their entireties.

This application is claims priority to U.S. Provisional Patent Application No. 62/950,475 filed on Dec. 19, 2019, the disclosure of which is incorporated herein by reference in its entirety.

TECHNICAL FIELD

The present invention is generally related to kitchen appliances and, more specifically food processors.

BACKGROUND

Increasingly, kitchen appliances are becoming multitasking appliances to, for example, save space. For example, a base unit that contains a motor may be able to couple to several different modules that used the motor for various tasks. A food processor is a kitchen appliance that uses input of a motor to drive various blades to manipulate (e.g., blend, chop, shred, slice, etc.) food. A food processor module may fit onto the motorized base. The food processor module engages with the motor to drive a rotary blade to blend, chop, shred, and/or slice food within a bowl of the food processor module.

SUMMARY

A food processing assembly is detachable from a base (sometimes referred to as a "blender base") that includes a motor and motor control. The food processing assembly selectively engages with the motor to drive a rotary shaft that is selectively couplable to multiple types of blades. The food processing assembly is configured to have a flexible operating configuration, and a storage configuration. In the operation configuration, the food processing assembly is configured to manipulate food. In this configuration, the food processing assembly may be comprised of different food manipulating components (e.g., lids, rotary blades, etc.) to process food in different manners. In the storage configuration, the food processing assembly is configured to store all of its components while minimizing the horizontal space occupied by the food processing assembly. In the storage configuration, the food processing assembly is not able to manipulate food. In some examples, the components of the food processing assembly are configured to interlock with each other in different ways depending on which one of the configurations the food processing assembly is currently in. The food processing assembly may have other features that, for example, improve processing of food and/or facilitate cleaning the food processing assembly.

An example food processor assembly includes an assembly base, a bowl base, a bowl, a lid, and a bald storage container. The assembly base includes a rotary input shaft configured to selectively couple to a coupler of a blender base. The bowl base selectively couples to the assembly base with the rotary input shaft extending through the bowl base. The bowl selectively couples to the bowl base. The bowl including a body and a central column integrally formed with the body though which the rotary input shaft extends. The lid selectively couples to the bowl. The lid includes a feed tube to receive food items to be processed. The lid having a first vertical orientation to selectively couple to the bowl and a second vertical orientation to selectively couple to the bowl. The blade storage container selectively couples to the lid when the lid is coupled to the bowl in the second vertical orientation.

BRIEF DESCRIPTION OF THE DRAWINGS

Operation of the present disclosure may be better understood by reference to the following detailed description taken in connection with the following illustrations, wherein.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a"

and "an" are generally intended to mean "one or more" unless context suggests otherwise.

Figure 1:
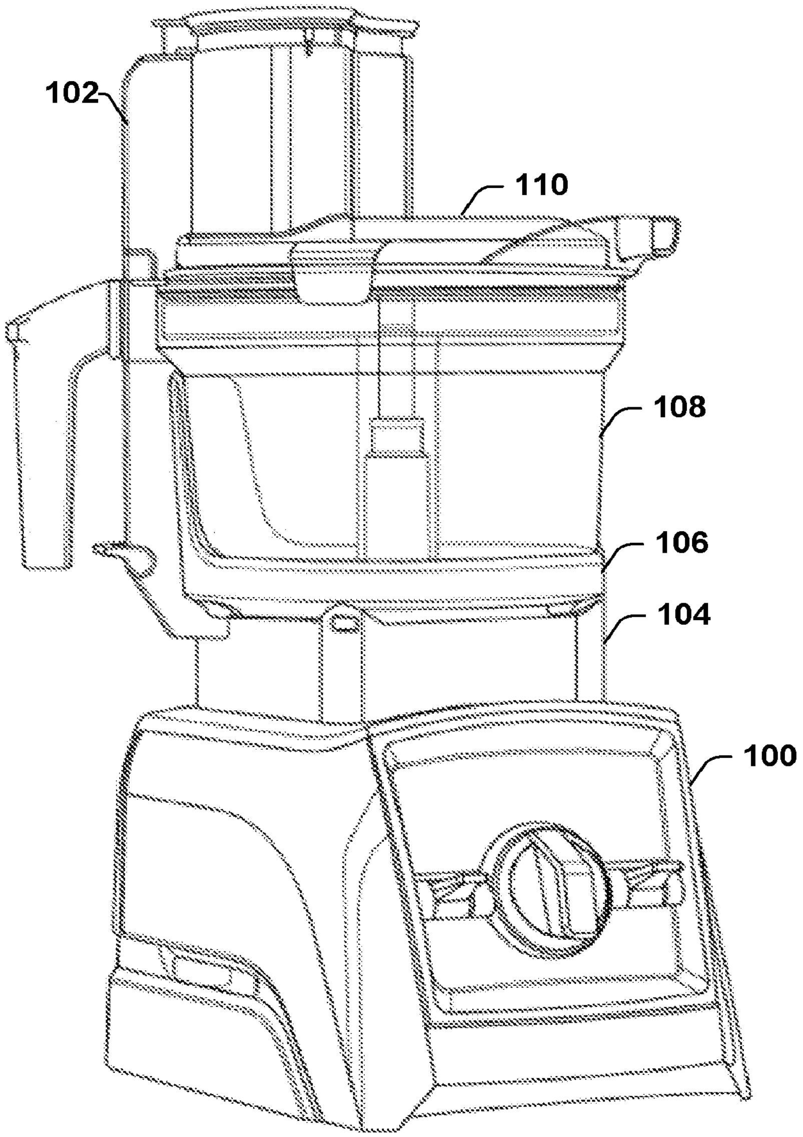
FIG. 1 illustrates a perspective view of a food processing system that includes a blender base and a food processing assembly, in accordance with the teachings of this disclosure.
Figure 2:
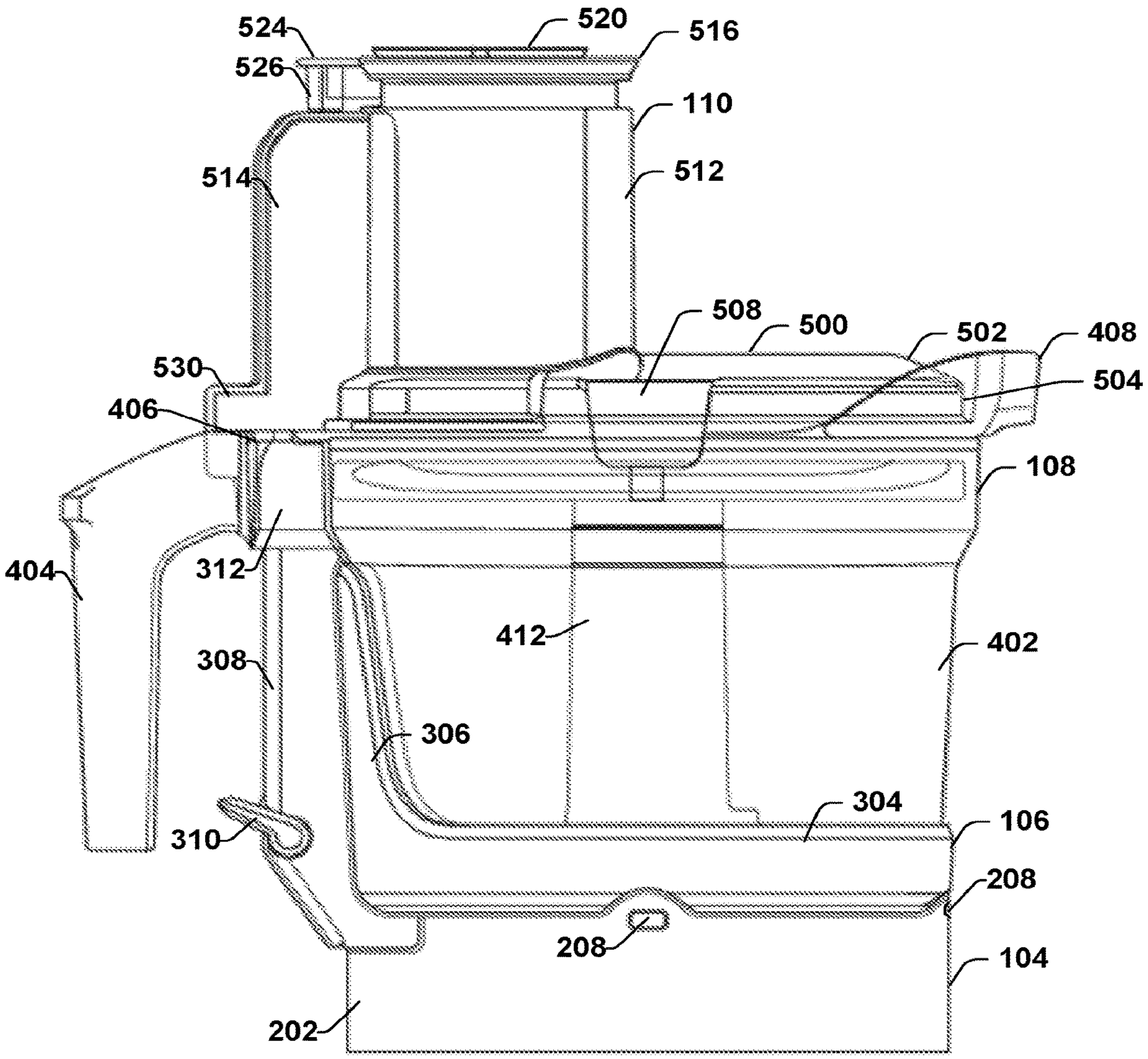
FIG. 2 illustrates a side view of the food processing assembly of FIG. 1 in an example operating configuration, in accordance with the teachings of this disclosure.

FIG. 1 illustrates a perspective view of a food processing system that includes a blender base 100 and a food processing assembly 102, in accordance with the teachings of this disclosure. The blender base 100 includes a motor and an interface to control and receive feedback regarding the motor (e.g., one or more switches, dials, and/or displays, etc.). The blender base 100 may also include a sensor reader (e.g., a near field communication (NFC) sensor, an radio frequency identification (RFID) reader, etc.) to read a corresponding sensor on attachments (such as, the food processing assembly 102, etc.) and motor control circuitry to control the motor based on the value(s) read by the sensor reader. An example blender base with a system to wirelessly detect properties of attachments is "Wireless Food Processor Discs," filed Mar. 12, 2018, assigned U.S. patent application Ser. No. 15/917,914, the entirety of which is incorporated herein by reference. The blender base 100 may have a configuration such as that disclosed in U.S. Pat. No. 10,413,131, titled "Interlocking Blending System," which is incorporated herein by reference in its entirety.

The blender base 100 includes a pedestal on which the food processing assembly 102 selectively sits and/or is attached to—the pedestal may also be configured to have operatively secured thereto a blending container of any appropriate configuration. The blender base 100 also includes a coupler to interface with the food processing assembly 102. The coupler is driven by a rotary output shaft driven by the motor of the blender base 100. The coupler may include an internally splined receptacle that is sized to receive corresponding splined connector (sometimes referred to as an "input shaft") at the base of the food processing assembly 102 to provide a detachable connection between the blender base 100 and the food processor assembly 102.

As illustrated in FIGS. 1-8, the food processing assembly 102 include multiple selectively attached components that couple together in different configurations to provide for one or more operating configurations and a storage configuration. In the operating configurations, food processing assembly 102 is configured to process food using various blades. In the storage configuration, the components are attached to limit horizontal space (e.g., counter/cupboard space, etc.) used to store the food processing assembly 102. In the illustrated examples, the food processing assembly 102 includes an assembly base 104, a bowl base 106, a bowl 108, a lid 110, blade storage container 112, and various blades 114*a*, 114*b*, and 114*c*.

The assembly base 104 includes a side wall 202 and a base 204 that define a cavity sized and configured to selectively receive the coupler of the blender base 100. The assembly base 104 also a rotary input shaft 206 rotationally coupled to the based 204. A proximal end of the rotary input shaft 206 has a splined connector to attach to the correspondingly splined receptacle of the blender base 100. A distal end of the rotary input shaft 206 includes a connector to selectively couple to the blades 114*a*, 114*b*, and 114*c*. The rotary input shaft 206 imparts rotary motion to the blades 114*a*, 114*b*, and 114*c* (e.g., 300-2,000 rotations per minute (RPMs), etc.) received from the coupler of the blender base 100. The side wall 202 defines multiple mounting holes 208 at different locations around the circumference of the side wall 202 to facilitate attaching the bowl 106 to the assembly base 104 at different orientations (e.g., a radial orientation of a handle 404 of the bowl 108 relative the controls of the blender base 100, etc.).

The bowl base 106 attaches to the assembly base 104 and receives the bowl 108. The bowl base 106 includes a base 302, a lip 304, and a partial side wall 306. The lip 304 extends from the base 302 and the partial side wall 306 extends from a portion of the lip 304. The base 302 defines a central hole. When assembled, the rotary input shaft 206 of the assembly base 104 extends through and is coaxial with the central hole. The base 302, the lip 304, and the partial side wall 306 define a cavity sized and shaped to receive the bowl 108. The bowl base 106 includes a latch 308 mounted on the partial side wall 306. A proximal end of the latch 308 is configured to selectively engage with one of the mounting holes 208, via a lever 310, to selectively affix the bowl base 106 to the assembly base 104. A distal end of the latch 308 may include a mount 312 that extends beyond the partial side wall 306 configured to be inserted into and extend through a corresponding hollow portion of the bowl 108 to, for example, prevent rotation of the bowl 108 about the bowl base 106 and/or to secure the lid 110.

The bowl 108 includes a bowl portion 402 to receive food processed or being processed by the food processor assembly 102, an integral handle 404, an integral interlock portion 406 between the bowl portion 402 and the handle 404, and an integral spout 408. The bowl portion 402 includes a lip 410 to provide for engagement to a latch of a lid, and a hollow central column 412 to through which, when the food processor assembly 102 is assembled, the rotary input shaft 206 extends and the input shaft shield 308 at least partially extends. The central column 412 is sized and shaped to receive the input shaft shield 308. When the food processor assembly 102, the spline mount on the distal end of the rotary input shaft 206 is exposed to selectively engage with one or more blades 114*a*, 114*b*, and 114*c* such that the blades 114*a*, 114*b*, and 114*c* are operationally within a cavity of the a bowl portion 402 and do not extend beyond a top of the bowl portion 402.

Figure 8:
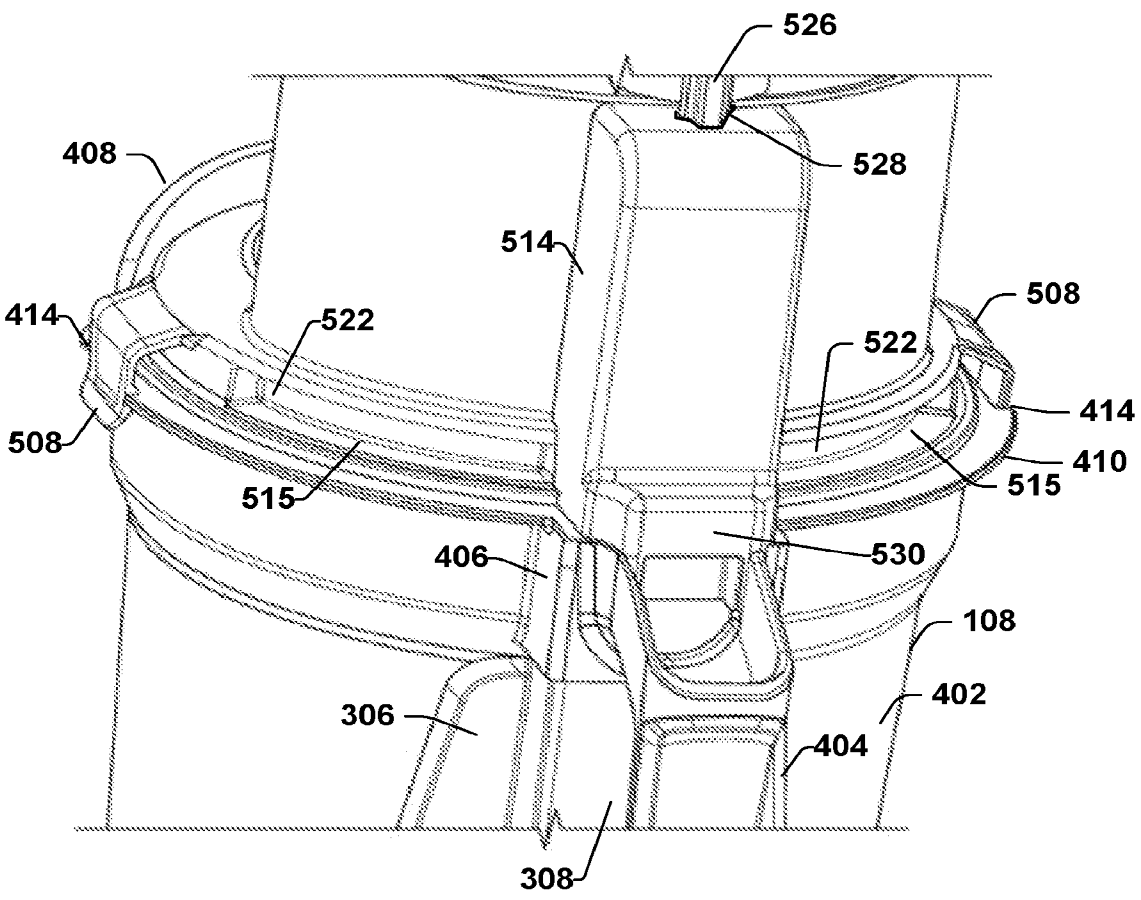
FIG. 8 illustrates a back perspective view of the feeder lid and the bowl of the food processing assembly of FIG. 1, in accordance with the teachings of this disclosure.

As best illustrated in FIG. 8, the lip 410 may define specific engagement points 414 which are sized and shaped to receive engagement with the corresponding latches of the lid 110 to, in some examples, define a specific connection orientation of the lid 110. This provides a connection such that the lid 110 snaps on the bowl 108 instead of a twist lock connection.

The interlock portion 406 between the bowl portion 402 and the handle 404 defines a cavity through which, when the food processor assembly 102 is assembled, the mount 312 extends to facilitate the bowl 108 not rotating on the bowl base 106 and/or to provide a physical connection between the lid 110 and the bowl base 106. In some examples, because the bowl 108 does not include any interlock components (e.g., the mount 312) but rather a cavity to for the interlock components, the bowl 108 is easier to clean as one integrally formed unit without any movable parts.

The feeder lid 110 includes a top substrate 500, an upper side wall 502, a lower side wall 504, a gasket 506, latches 508, a hollow feeding tube 512, and an interlock 514. The upper side wall 502 extends from the top substrate 500. In some examples, the upper side wall 502 increases in diameter from the top substrate 500 (sometimes referred as the "initial diameter") until the outer diameter of the upper side wall 502 (sometimes referred to as the "final diameter") is the outer diameter of the bowl portion 402. In some examples, the initial diameter is smaller than an inner diameter of the bowl portion 402 such that the outer diameter of the upper side wall 502 is the inner diameter of the bowl portion 402 at some point between the initial diameter and the final diameter. In such a manner, when the lid 110 is inverted relative the bowl 108, a portion of the upper side wall 502 sits within the bowl portion 402. As best shown in FIG. 8, in some examples, the upper side wall 502 may define cavities 515 proximate the feeding tube 512 on both sides of the interlock 514 to, for example, reduce an amount of material used to form the lid 110.

The lower side wall 504 extends from the upper side wall 502. The outer diameter of the lower side wall 504 is approximately the inner diameter of the bowl portion 402 such that, when the lid 110 is attached to the bowl 108, the lower side wall 504 fits within the bowl portion 402. The gasket 506 is at an interface between the upper side wall 502 and the lower side wall 504. When the lid 110 is attached to the bowl 108, the gasket 506 provides a liquid resistant seal between the lid 110 and the bowl 108.

The latches 508 extend from the interface of the top substrate 502 and the upper side wall 502 to provide snapping engagement with the bowl 108. The latches 508 are flexible enough to engage with the engagement points 414 of the bowl 108 to affix the lid 110 to the bowl 108 and, with some force, disengage with the engagement points 414 to remove the lid 110 from the bowl 108.

Figure 7:
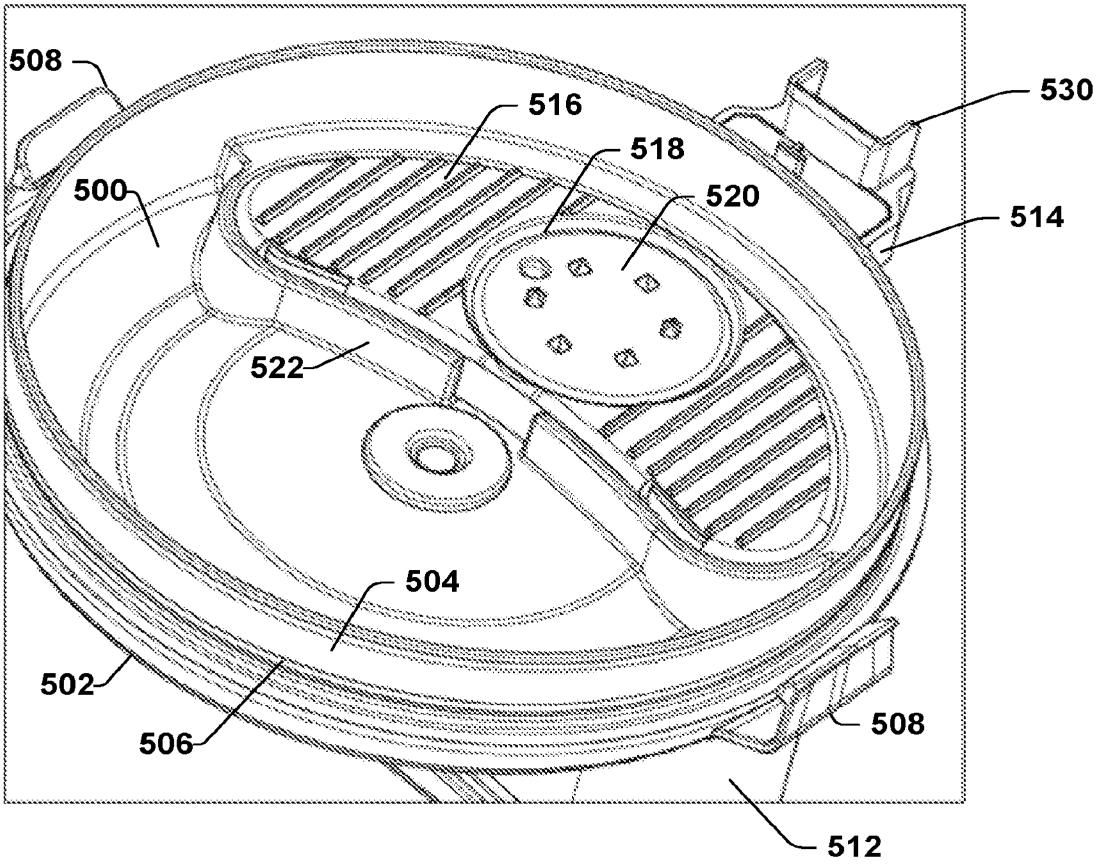
FIG. 7 illustrates a bottom perspective view of a feeder lid of the food processing assembly of FIG. 1, in accordance with the teachings of this disclosure.

The feeding tube 512 is configured to fit between the interior wall of the bowl portion 402 of the bowl 108 and the central column 412 of the bowl 108. The feeding tube 512 is sized to receive a large plunger 516. The feeding tube 512 is positioned radially offset from a center of the lid 110. This position introduces the food items to the blades 114*a* and 114*b* radially offset from center so that the cutting operation is periodic and sequential for slicing, chopping or shredding. The large tamper 516 provides for manual translation of food items through the feeding tube 512. The large tamper 516 may include a flange to facilitate the large tamper 516 being positioned and/or stored within the feeding tube 512. The large tamper 516 defines a secondary feeding tube 518 to accommodate a small tamper 520. The small tamper 520 provides for manual translation of food items through the secondary feeding tube 518. For example, the large tamper 516 may be used for relatively large food items to be processed and the small tamper 520 may be used for relatively small food items to be processed. In some examples, the small tamper 520 may include a flange to facilitate the small tamper 520 being positioned and/or stored within the secondary feeding tube 512. In some examples, the small tamper 520 may be hollow and may define a hole or passage 521 sized to drizzle liquid into the bowl 108 to, for example, create an emulsification with the food item in the bowl 108. In some examples, as best illustrated by FIG. 7, feeding tube 512 includes a rib 522 that extends into an interior of the lid 110 to prevent food items becoming trapped between the tampers 516 and 520 and a top of the interior of the lid 110. The large tamper 516 includes a tab 524 with a keyed protrusion 526 centered on and protruding from the tab 224. The protrusion 526 is configured to interfaces with the interlock 514 when the small tamper 520 is used to resist movement of the large tamper 516 that may be caused by food items being pushed through the secondary feeding tube 518.

The interlock 514 is affixed to the lid 110 such that the interlock 514 extends along the feeding tube 512, and in some examples, at least partially embedded into the feeding 512. A proximal end of the interlock 514 is configured to, when the lid 110 is affixed to the bowl 108, the interlock 514 slides over a portion of the mount 312. In some examples, the proximal end of the interlock 514 also includes an extension 526 that defines a slot in which a wall of the interlock portion 406 is received such at the extension 530 extends into a cavity defined by 404. As best shown in FIG. 8, the distal end of the interlock 514 defines a keyed slot 528 to accept the keyed protrusion 526.

Figure 3:
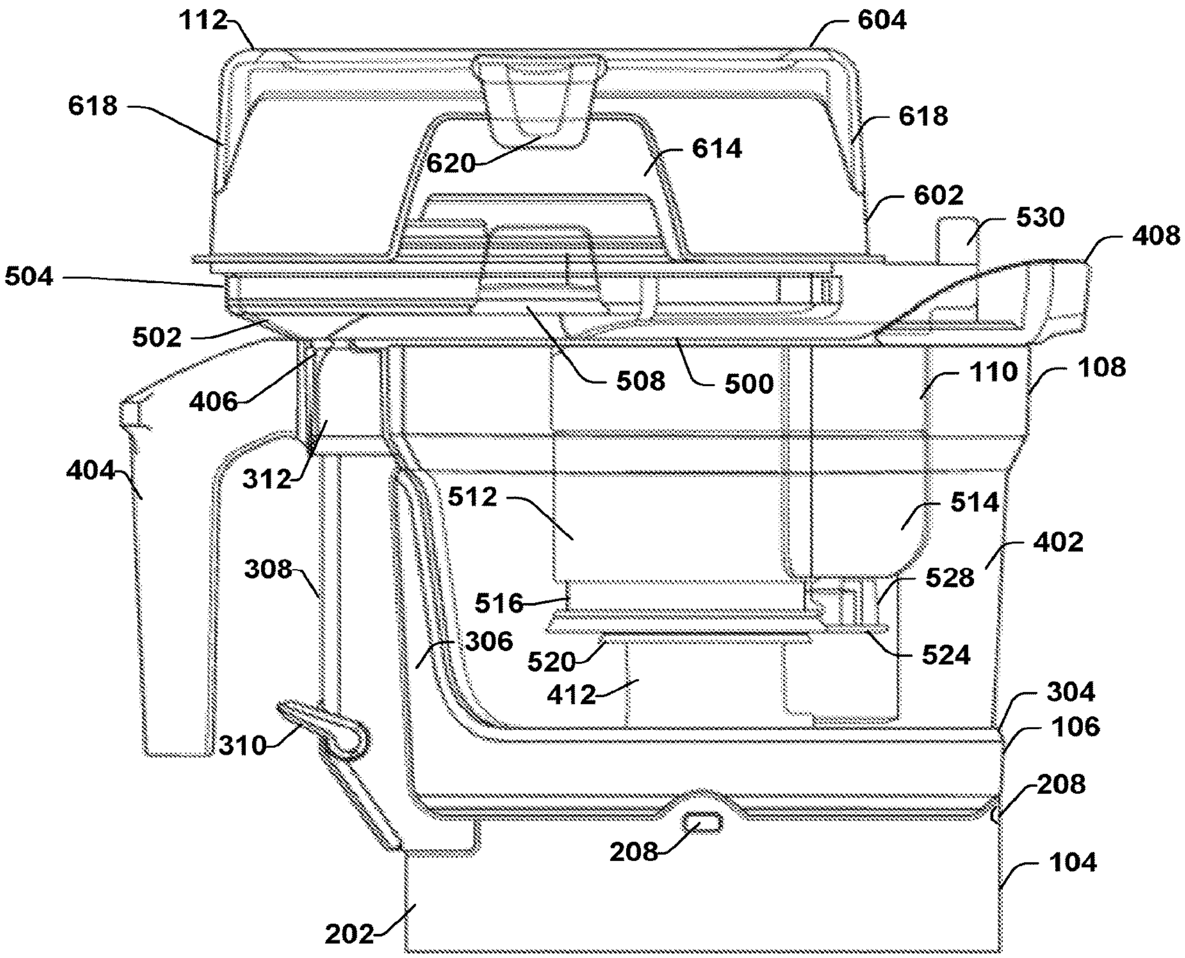
FIG. 3 illustrates a side view of the food processing assembly of FIG. 1 in a storage configuration, in accordance with the teachings of this disclosure.
Figure 4:
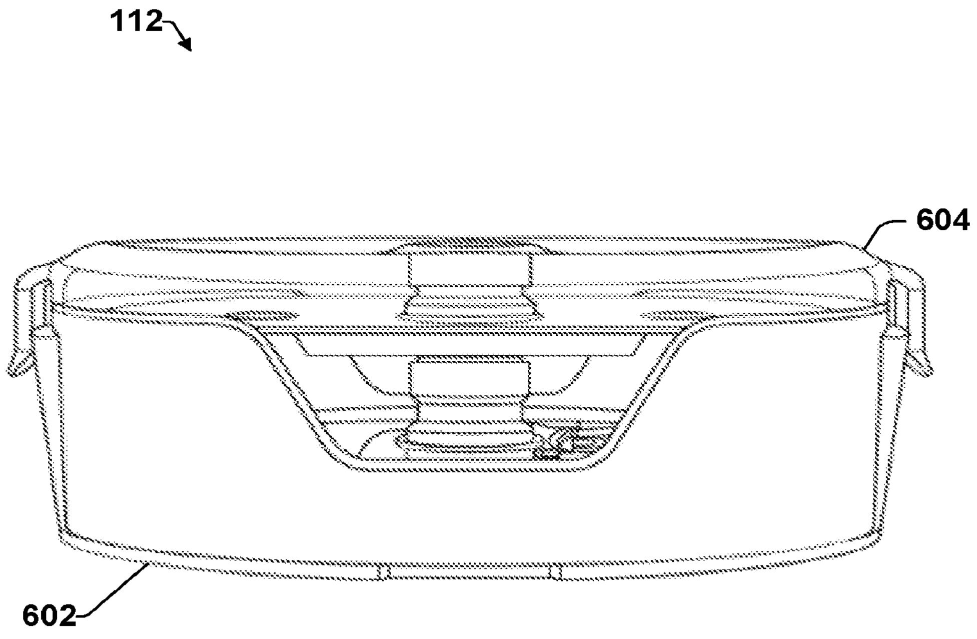
FIG. 4 illustrates a blade storage container of with a dual purpose flat lid of the food processing assembly of FIG. 1, in accordance with the teachings of this disclosure.
Figure 6:
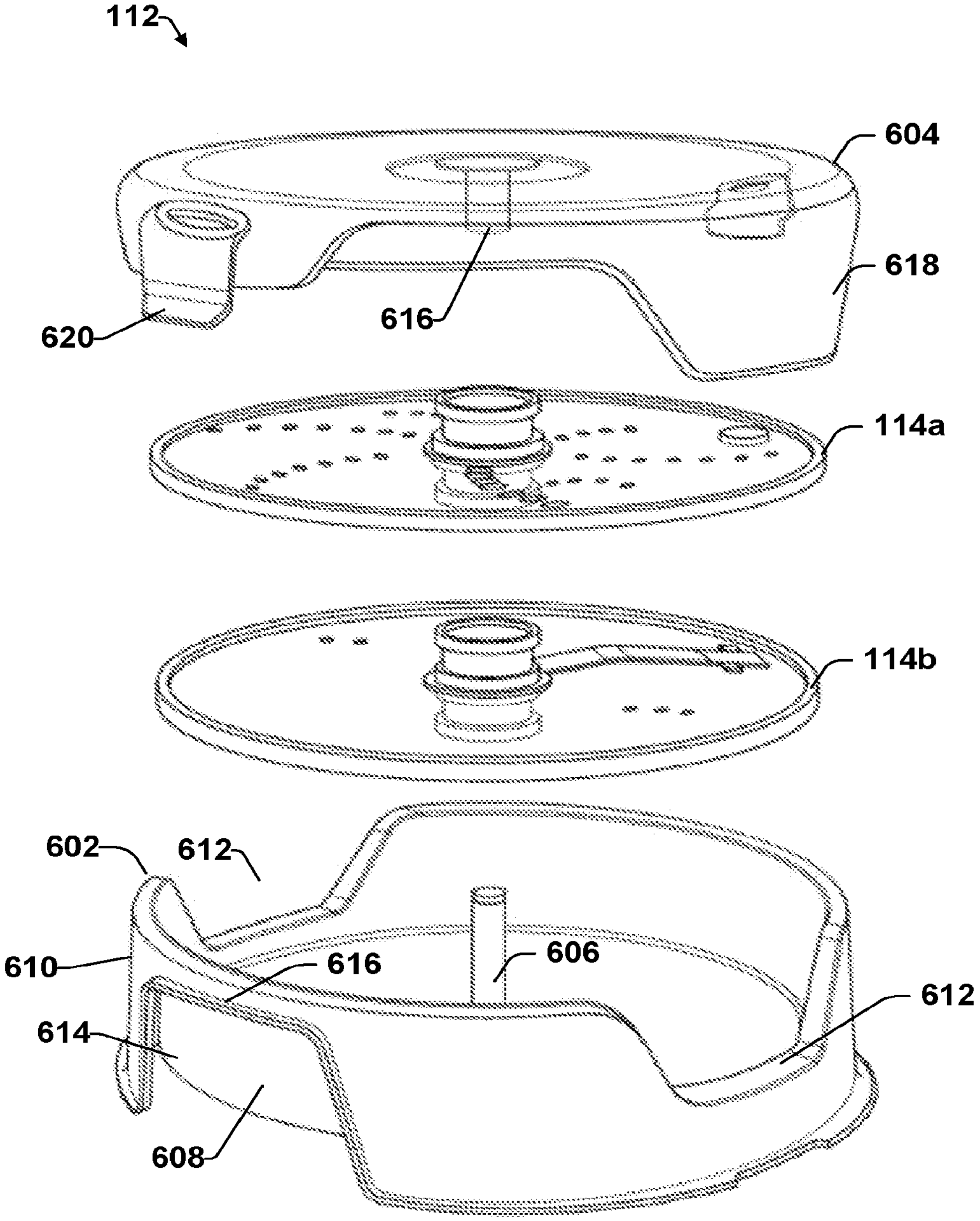
FIG. 6 illustrates and exploded view of the blade storage container of FIG. 4 with example blades and the dual purpose flat lid, in accordance with the teachings of this disclosure.

The blade storage container 112 includes a base 602 and a lid 604. The base 602 includes a central pillar 606 to receive the blades 114*a* and 114*b*. The base 602 includes an interior wall 608 and an exterior wall 610. The interior wall 608 and the exterior wall 610 define a first set of notches 612 to, for example, facilitate manipulating the blades 114*a* and 114*b* that are stored in the blade storage container 112 about the pillar 606. The exterior wall 610 defines a second set of notches 614 that form engagement points 616 to facilitate the lid 604 selectively attaching to the base 602. As best illustrated in FIGS. 3 and 6, the second set of notches 614 is configured to, when the food processing assembly 102 is in a storage configuration, accommodate (e.g., not interfere with, etc.) the latches 508 that extend from the lid 110 of the food processing assembly 102. The interior wall 608 and the exterior wall 610 define a space between them to receive the lower side wall 504 of the lid 110 of the food processing assembly 102.

The lid 604 includes a connector 616, wings 618, and latches 620. When the lid 602 is attached to the base 602, (i) the connector 616 receives and slides over the central pillar 606, (ii) the wings 618 fit within the first set of notches 612 so that the lid 604 forms a barrier against outside object entering the blade storage container 112, and (iii) the latches 620 engage with the engagement points 616.

Figure 5:
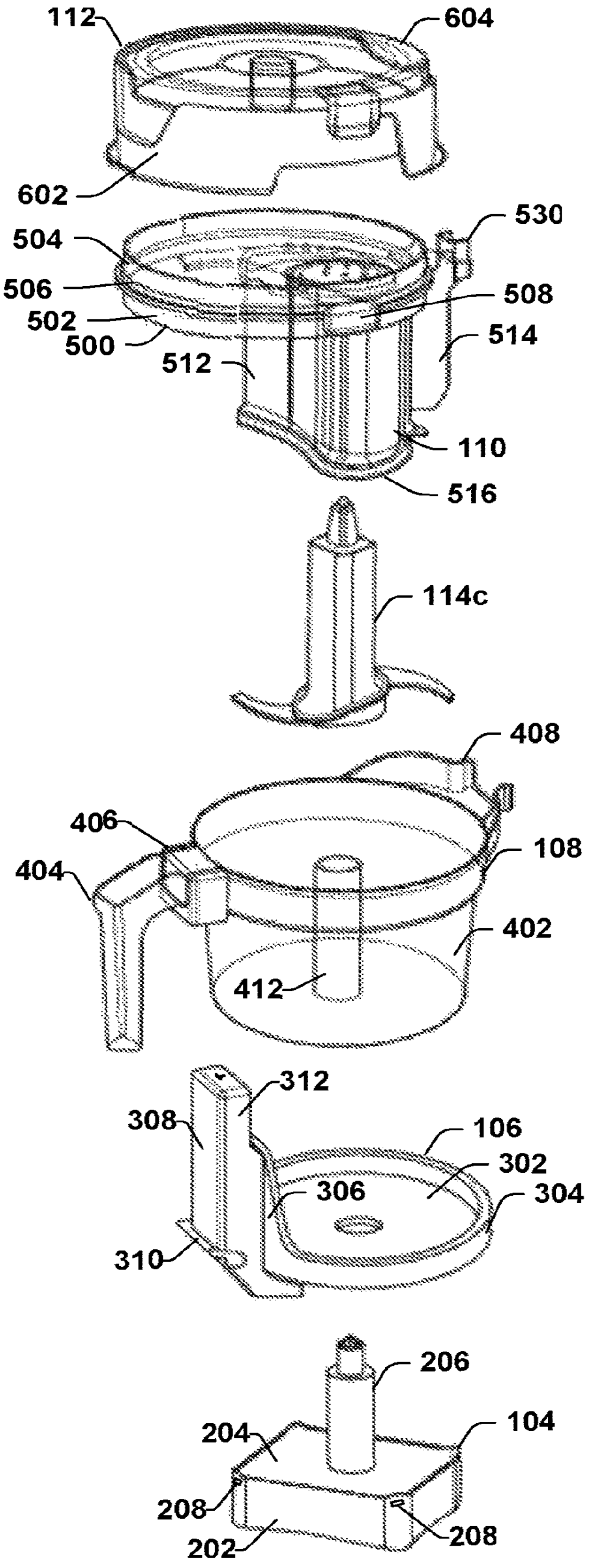
FIG. 5 illustrates an exploded view of the food processing assembly of FIG. 1, in accordance with the teachings of this disclosure.

The food processing assembly 102 has an operational configuration (FIGS. 1 and 2) and a storage configuration (FIGS. 3 and 5). In the operation configuration, (a) the food processing assembly 102 is assembled to process food items using the blender base 100, (b) the bowl base 106 is connected to the assembly base 104, (c) the bowl 108 slide onto the bowl base 106, (d) one of the blades 114*a*, 114*b*, and 114*c* is attached to the rotary input shaft 206, and (e) the lid 110 is connected to the bowl 108 in an operating orientation where the feeding tube 512 is exterior to the bowl 108. In the storage configuration, (a) the food processing assembly 102 is assembled to process food items using the blender base 100, (b) the bowl base 106 is connected to the assembly base 104, (c) the bowl 108 slid onto the bowl base 106, (d) the processing blade 114*c* is attached to the rotary input shaft 206, (e) the lid 110 is placed in the bowl 108 in a storage orientation where the feeding tube 512 and a portion of the upper side wall 502 is interior to the bowl 108, (0 the base 602 of the blade storage container 112 is sitting on the lid 110 such that the lower side wall 504 is in the space between the interior wall 608 and the exterior wall 610 of the storage container 112, (g) the disc blades 114*a* and 114*b* are stored about the pillar 606, and (h) the lid 604 of the blade storage container 112 is affixed to the base 602.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. A blade storage container, comprising:

a base having at least one side wall defining a storage cavity;

a lid removably coupled to the base; and a pillar disposed within the storage cavity of the base, the pillar supporting one or more food processor blades, wherein the at least one side wall defines:

at least one first notch that provides access to the storage cavity, and at least one second notch that forms an engagement point to secure the lid to the base and provides a clearance for components of a cap of a food processing assembly supporting the base thereon when the food processing assembly is in a storage configuration.

2. The blade storage container of claim 1, wherein the lid further comprises a connector that slidably engages with the pillar.

3. The blade storage container of claim 1, wherein the lid further comprises at least one wing that engages with the at least one first notch to form a barrier against external objects entering the blade storage container.

4. The blade storage container of claim 1, wherein the one or more food processor blades are sized to be stored around the pillar when the food processing assembly is in the storage configuration.

5. The blade storage container of claim 1, wherein the base and the lid are substantially circular in shape.

6. The blade storage container of claim 1, where the at least one side wall comprises an interior wall and an exterior wall separated from the interior wall to define a space therebetween.

7. The blade storage container of claim 1, wherein the lid further comprises at least one latch that selectively engages with the engagement point to secure the lid to the base.

8. The blade storage container of claim 7, wherein the at least one first notch is misaligned with the at least one latch when the food processing assembly is in the storage configuration.

9. The blade storage container of claim 7, wherein the at least one latch selectively engages with the engagement point via a snapping mechanism.

10. A food processing assembly comprising:

a cap comprising an upper side wall, a lower side wall, and a gasket therebetween; and a blade storage container configured to selectively couple to the cap, the blade storage container comprising:

a base having at least one side wall defining a storage cavity;

a lid removably coupled to the base; and a pillar disposed within the storage cavity of the base, the pillar supporting one or more food processor blades, wherein the at least one side wall defines:

at least one first notch that provides access to the storage cavity, and at least one second notch that forms an engagement point to secure the lid to the base and provides a clearance for components of the cap of the food processing assembly, wherein the cap supports the base thereon when the food processing assembly is in a storage configuration; and an interior wall and an exterior wall separated from the interior wall to define a space therebetween, wherein the cap supports the blade storage container such that the lower side wall is disposed within the space between the interior wall and the exterior wall.

11. The food processing assembly of claim 10, further comprising an assembly base with a rotary input shaft configured to selectively couple to a coupler of a blender base, the assembly base defining a plurality of mounting holes.

12. The food processing assembly of claim 11, further comprising a bowl base configured to selectively couple to the assembly base, the rotary input shaft extending through the bowl base, the bowl base comprising a latch including a lever, the bowl base selectively coupling to the assembly base via one of the plurality of mounting holes when the lever is in a locking position.

13. The food processing assembly of claim 12, further comprising a bowl configured to selectively couple to the bowl base, the bowl including a body and a central column integrally formed with the body through which the rotary input shaft extends.

14. The food processing assembly of claim 13, wherein the cap has a vertical orientation to selectively couple to the bowl.

15. The food processing assembly of claim 14, wherein the blade storage container is configured to selectively couple to the cap when the cap is coupled to the bowl in the vertical orientation.

* * * * *